United States Patent [19]

Nishimura

[11] Patent Number: 4,818,022

[45] Date of Patent: Apr. 4, 1989

[54] SEAT BELT ANCHOR-EQUIPPED SEAT SLIDE DEVICE

[75] Inventor: Shinichi Nishimura, Zama, Japan

[73] Assignee: Nissan Motor Co., Ltd., Yokohama, Japan

[21] Appl. No.: 937,422

[22] Filed: Dec. 3, 1986

[30] Foreign Application Priority Data

Dec. 9, 1985 [JP] Japan ............................ 60-189925[U]

[51] Int. Cl.$^4$ ............................................. B60R 21/00
[52] U.S. Cl. .................................... 297/473; 297/470; 280/804
[58] Field of Search ............... 297/473, 470, 468, 216; 248/492; 280/804, 805, 801

[56] References Cited

U.S. PATENT DOCUMENTS

| | | | |
|---|---|---|---|
| 3,186,760 | 6/1965 | Lohr et al. | 297/470 X |
| 4,345,781 | 8/1982 | Suzuki et al. | 280/804 X |
| 4,488,754 | 12/1984 | Heesch et al. | 280/805 X |

FOREIGN PATENT DOCUMENTS

| | | | |
|---|---|---|---|
| 2742668 | 3/1979 | Fed. Rep. of Germany | 297/470 |
| 2803896 | 8/1979 | Fed. Rep. of Germany | 297/473 |
| 2820589 | 11/1979 | Fed. Rep. of Germany | 297/473 |
| 2300696 | 10/1976 | France | 280/804 |
| 8975 | 1/1980 | Japan | 297/473 |
| 140252 | 8/1982 | Japan | 280/804 |

Primary Examiner—Kenneth J. Dorner
Assistant Examiner—Laurie K. Cranmer
Attorney, Agent, or Firm—Lowe, Price, LeBlanc, Becker & Shur

[57] ABSTRACT

A toughly constructed channel member is interposed between a frame of a seat cushion and a movable rail of a seat slide device. A first member is secured to a stationary rail of the seat slide device and having a first lock member, and a second member is secured to the channel member. An anchor holding bracket is secured to the second member and having a second lock member, and a belt anchor device is pivotally connected to the anchor holding bracket. The first and second lock members interlock with each other in such a manner that the first lock member is slidable with respect to the second lock member.

4 Claims, 3 Drawing Sheets 4,818,022

SEAT BELT ANCHOR-EQUIPPED SEAT SLIDE DEVICE

BACKGROUND OF THE INVENTION

1. Field of the Invention

The present invention relates in general to seat slide devices for sliding a seat in fore-and-aft directions to a desired position, and more particularly to seat slide devices of a type equipped with an anchor device of a seat belt.

2. Description of the Prior Art

In order to clarify the task of the present invention, one conventional seat slide device of the type as mentioned hereinabove will be described with reference to FIGS. 4 to 6 of the drawings.

Referring to FIG. 4, there is shown a vehicle cabin in which the conventional seat slide device 100 is arranged to support an assistant driver's seat 102. In the drawing, designated by numeral 104 is a vehicle body, and 104a is a floor panel of the body 104. The seat 102 comprises a seat cushion 106 mounted on the seat slide device 100 and a seat back 108 pivotally connected to the seat cushion 106 through a known reclining device.

As is seen from FIG. 4, the seat slide device 100 comprises generally two, that is, first and second slide units 100a and 100b which are arranged in parallel between the seat cushion 106 and the floor panel 104a.

As is understood from FIGS. 5 and 6, each slide unit 100a or 100b comprises a stationary rail 110 mounted through mounting brackets 112 (only one is shown) to the floor panel 104a, a movable rail 114 secured to the seat cushion 106 and slidably disposed on the stationary rail 110, and a position locker (not shown) for locking the movable rail 114 at a desired position relative to the stationary rail 110. As is seen from FIG. 6, the movable rail 114 is connected to a rectangular frame 106a of the seat cushion 106 through bolts 116 and nuts 118.

As is seen from FIGS. 5 and 6, an elongate stationary bracket 120 is secured to the bottom portion of the stationary rail 110 of the first slide unit 100a to extend along the same. The bracket 120 is formed at its outboard side with a channel-shaped portion 120a which extends therealong with the groove facing downward.

A generally L-shaped bracket 122 is secured at its horizontal portion to the rectangular frame 106a of the seat cushion 106 through the bolts 116 and the nuts 118. More specifically, the horizontal portion is tightly interposed between the frame 106a and the movable rail 114.

An anchor holding bracket 124 is welded to a vertical portion of the L-shaped bracket 122, so that the anchor holding bracket 124, the L-shaped bracket 122, the movable rail 114 and the seat cushion 106 can move together as a unit relative to the stationary rail 110 and the stationary bracket 120. The anchor holding bracket 124 is formed at its lower section with a channel-shaped portion 124a which is slidably engaged or interlocked with the channel-shaped portion 120a of the stationary bracket 120.

A belt anchor device 126 is pivotally connected, through a bolt 128 and a nut 130, to the anchor holding bracket 124. The belt anchor device 126 is equipped with a buckle 126a. Designated by numeral 132 in FIG. 5 is a part of the reclining device.

Upon rapid braking or the like, a considerable force is suddenly applied to the seat belt by the occupant on the seat 102. The force applied to the seat belt is thus transmitted to both the rectangular frame 106a of the seat cushion 106 and the movable rail 114 through the belt anchor device 124 and the L-shaped bracket 122. When, due to a vehicle collision or the like, a great impact force is applied to the seat belt and thus to the L-shaped bracket 122, the latter is forced to flex to such a degree that the channel-shaped portion 124a of the anchor holding bracket 124 is tightly interlocked with the channel-shaped portion 120a of the stationary bracket 120 thereby suppressing further flexing of the L-shaped bracket 122.

However, due to the inherent construction of the conventional seat slide device 100 as described hereinabove, the impact force transmitted to the rectangular frame 106a of the seat cushion 106 sometimes deforms the frame 106a. This is because the impact force applied to the seat belt is substantially directly transmitted to the rectangular frame 106a. Thus, when the frame 106a is constructed of thinner metal for the purpose of reducing the weight of the seat assembly, such undesirable deformation tends to occur.

SUMMARY OF THE INVENTION

It is therefore an essential object of the present invention to provide an improved belt anchor-equipped seat slide device which is free of the drawback encountered in the above-mentioned conventional seat slide device.

According to the present invention, there is provided a seat slide device for sliding a seat to a desired position relative to a stationary floor portion, which includes a pair of stationary rails secured to the floor portion, a pair of movable rails slidably disposed on the stationary rails and secured to a frame member of the seat, a pair of toughly constructed channel members each being tightly interposed between each of the movable rails and the frame member of the seat, a first member secured to one of the stationary rails and having a first lock member at its outwardly extending portion, a second member secured to one of the channel members and extending outwardly therefrom, an anchor holding bracket secured to the outwardly extending portion of the second member and having a second lock member at its downwardly extending portion, and a belt anchor device pivotally connected to the anchor holding bracket, the first and second lock members interlocking with each other in such a manner that the first lock member is slidable with respect to the second lock member.

DETAILED DESCRIPTION OF THE INVENTION

In the following, a belt anchor-equipped seat slide device 10 of the present invention will be described in detail with reference to FIGS. 1 to 3, which is free of the drawback encountered in the above-mentioned conventional seat slide device 100.

Figure 1:
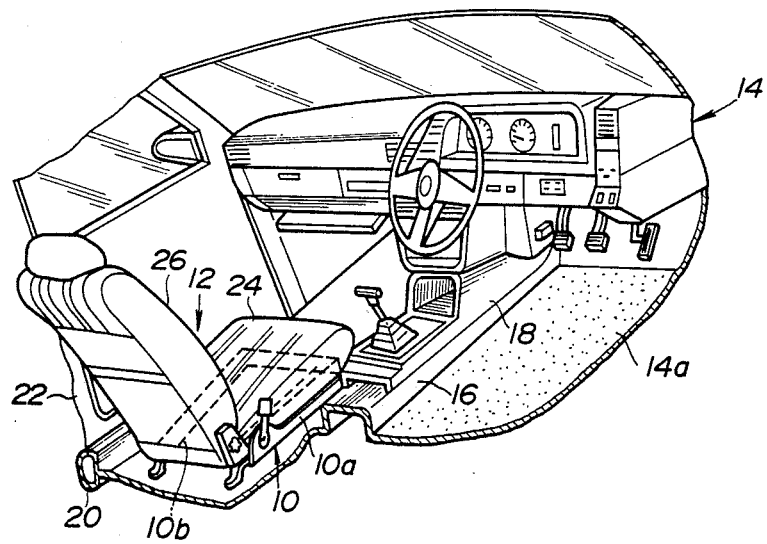
FIG. 1 is a sketch of a vehicle cabin in which a belt anchor-equipped seat slide device of the present invention is practically arranged for supporting an assistant driver's seat.

Referring to FIG. 1, there is shown a vehicle cabin in which the seat slide device 10 of the invention is practically arranged to support an assistant driver's seat 12. In the drawing, designated by numeral 14 is a vehicle body, and 14a is a floor panel of the vehicle body 14. The floor panel 14a is formed with a longitudinally extending tunnel portion 16 on which a console box 18 is mounted. Designated by numeral 20 is a side sill welded to a side edge of the floor panel 14a, and designated by numeral 22 is a side door which is hinged at its forward end to the vehicle body 14.

The assistant driver's seat 12 shown comprises a seat cushion 24 which is mounted on the seat slide device 10 and a seat back 26 which is pivotally connected to the seat cushion 24 through a reclining device in a manner as will be described hereinafter.

Figure 2:
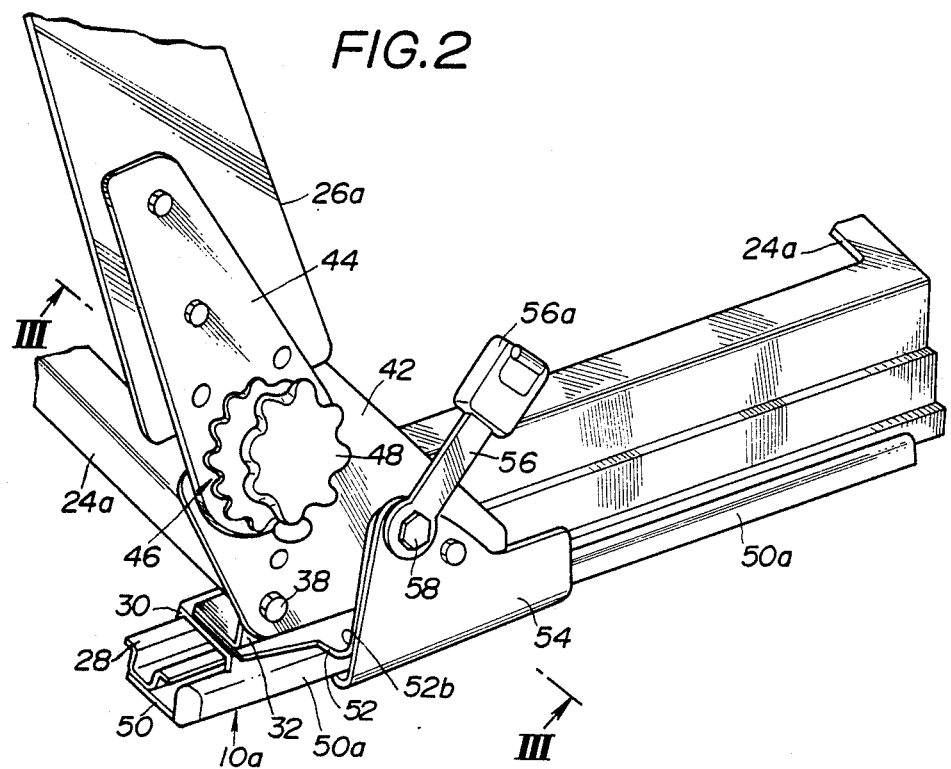
FIG. 2 is a partial and perspective view of the seat slide device of the invention, showing in detail the essential part of the invention.

As is understood from FIG. 2, the seat cushion 24 comprises a generally rectangular frame 24a on which a cushion pad (not shown) is mounted, and the seat back 26 comprises an arch-like frame 26a on which a cushion pad (not shown) is mounted.

As is seen from FIG. 1, the seat slide device 10 of the invention comprises generally two, that is, first and second slide units 10a and 10b which are arranged parallel between the seat cushion 24 and the floor panel 14a.

Figure 3:
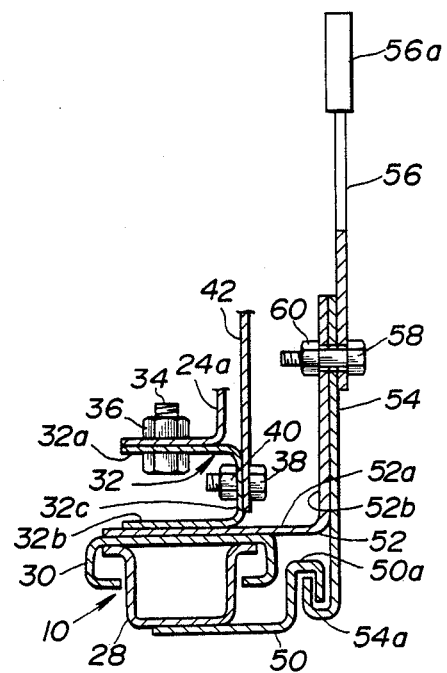
FIG. 3 is a sectional view taken along the line III—III of FIG. 2.
Figure 4:
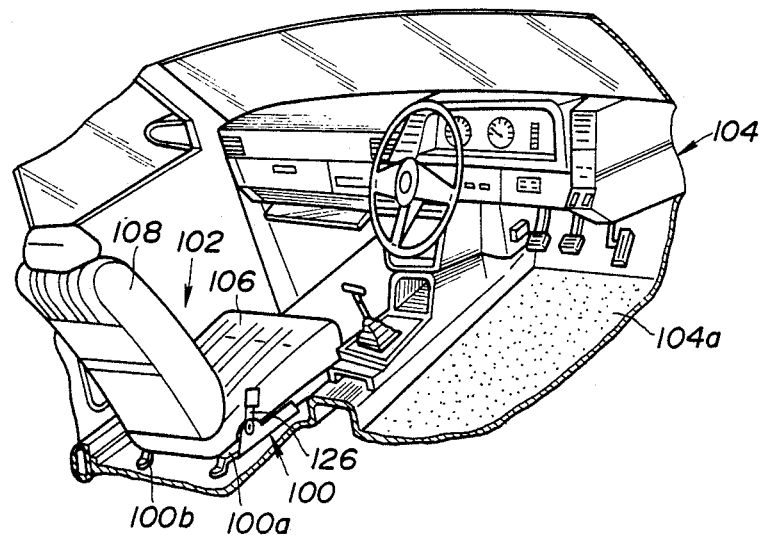
FIG. 4 is a view similar to FIG. 1, but showing the above-mentioned conventional seat slide device.
Figure 5:
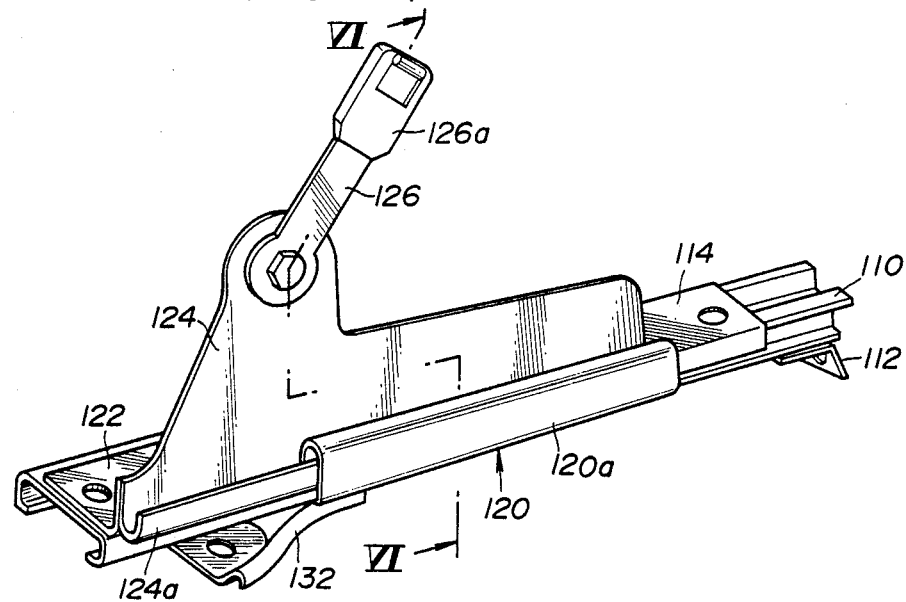
FIG. 5 is a partial and perspective view of the conventional seat slide device of FIG. 4.
Figure 6:
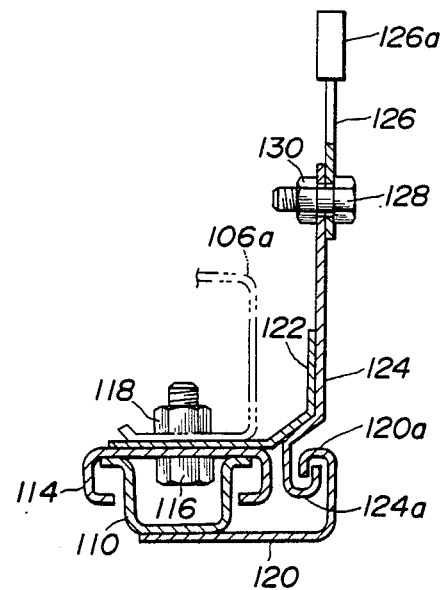
FIG. 6 is a sectional view taken along the line VI—VI of FIG. 5.

As is seen from FIGS. 2 and 3, each slide unit 10a or 10b of the seat slide device 10 comprises a stationary rail 28 secured to the floor panel 14a, and a movable rail 30 secured to the seat cushion 24 and slidably disposed on the stationary rail 28. Thus, the seat 12 is slidable in fore-and-aft directions relative to the floor panel 14a. Although not shown in the drawings, a known position locker is arranged between the stationary rail 28 and the movable rail 30 in order to lock the movable rail 30 at a desired fore-and-aft position relative to the stationary rail 28. The seat 12 can be locked at a desired position relative to the floor panel 14a.

A toughly constructed channel member 32 is disposed between each movable rail 30 and each side of the rectangular frame 24a of the seat cushion 24. As is seen from FIG. 3, the channel member 32 is secured at its upper horizontal wall 32a to the rectangular frame 24a by bolts 34 and nuts 36 and secured at its lower horizontal wall 32b to the movable rail 30 by welding. Secured to a side vertical wall 32c of each channel member 32 by bolts 38 and nuts 40 is a base plate 42 of the afore-mentioned reclining device.

As is seen from FIG. 2, the reclining device comprises the two base plates 42 (only one is shown) secured to their associated channel members 32, two arms 44 respectively secured to the side portions of the arch-like frame 26a of the seat back 26, two pivot devices (not shown) each being arranged between the base plate 42 and the arm 44 to permit pivotal movement of the arm 44 relative to the base plate 42, and an angular position locker associated with one of the pivot devices for locking the arm 44 at a desired angular position relative to the base plate 42. Designated by numeral 48 is a knob for manipulating the angular position locker 46. Thus, by manipulating the knob 48, the seat back 26 can be tilted and locked at a desired angular position relative to the seat cushion 24.

As is seen from FIGS. 2 and 3, an elongate stationary bracket 50 is secured to the bottom portion of the stationary rail 28 of the first slide unit 10a to extend along the same. As is best understood from FIG. 3, the bracket 50 is formed at its outboard side with a channel-shaped portion 50a which extends therealong with the groove facing downward.

A generally L-shaped bracket 52 is tightly secured at its horizontal portion 52a to the movable rail 30 to move therewith. In the illustrated embodiment, the horizontal portion 52a of the bracket 52 is securely interposed between the movable rail 30 and the lower wall 32b of the channel member 32.

An anchor holding bracket 54 is secured, by bolts, to the vertical portion 52b of the bracket 52, so that the anchor holding bracket 54, the L-shaped bracket 52 and the movable rail 30 can move together as a unit relative to the stationary parts 28 and 50. As is understood from FIG. 3, the anchor holding bracket 54 is formed at its lower side with a channel-shaped portion 54a which is slidably engaged or interlocked with the channel-shaped portion 50a of the stationary elongate bracket 50.

A belt anchor device 56 is pivotally connected, through a bolt 58 and a nut 60, to both the vertical portion 52b of the L-shaped bracket 52 and the anchor holding bracket 54, as is seen from FIG. 3. The belt anchor device 56 is equipped with a buckle 56a to which a tongue member (not shown) of a seat belt is detachably connected when the seat belt is in use.

Upon rapid braking or the like, a considerable force is applied to the seat belt through a belt wearer on the seat 12. However, in the invention, the force applied to the seat belt is transmitted to both the channel member 32 and the movable rail 30 through the belt anchor device 56 and the L-shaped bracket 52. That is, the shock upon the rapid braking is not directly applied to the rectangular frame 24a of the seat cushion 24, but indirectly applied to the same. It is further to be noted that a considerable inertia force which is produced by the seat back 26 upon the rapid braking is received by the channel member 32 through the base plate 42 of the reclining device.

When, due to a vehicle collision or the like, a great impact force is applied to the seat belt and thus to the L-shaped bracket 52, the latter is flexed causing tight interlocking between the channel-shaped portion 54a of the anchor holding bracket 54 and the channel-shaped portion 50a of the stationary elongate bracket 50, like in the case of the above-mentioned conventional seat slide device 100.

As will be understood from the foregoing description, in the present invention, the undesirable deformation of the frame of the seat cushion is suppressed or at least minimized even in a vehicle collision.

What is claimed is:

1. A seat slide device for sliding a seat to a desired position relative to a stationary floor portion, comprising:
    a pair of stationary rails secured to said floor portion;
    a pair of movable rails slidably disposed on said stationary rails and secured to a frame member of said seat;
    a pair of toughly constructed channel members each being tightly interposed between each of the movable rails and the frame member of the seat;

a first member secured to one of the stationary rails and having a first lock member at its outwardly extending portion;

a second member secured to one of the channel members and extending outwardly therefrom;

an anchor holding bracket secured to an outwardly extending portion of said second member and having a second lock member at its downwardly extending portion; and a belt anchor device pivotally connected to both said outwardly extending portion of said second member and said anchor holding bracket, said first and second lock members interlocking with each other such that said first lock member is slidable with respect to said second lock member.

2. A seat slide device as claimed in claim 1, wherein one of said channel members has a wall to which a base plate of a reclining device is secured, said reclining device permitting pivotal movement of a seat back relative to a seat cushion of the seat.

3. A seat slide device as claimed in claim 2 wherein said second member is securely interposed between the associated channel member and the associated movable rail.

4. A seat slide device as claimed in claim 3, wherein said first and second lock members are each formed like a channel member.

* * * * *